US008106845B2

(12) United States Patent  
Savry

(10) Patent No.: US 8,106,845 B2
(45) Date of Patent: Jan. 31, 2012

(54) OMNIDIRECTIONAL FLAT ANTENNA AND METHOD OF PRODUCTION

(75) Inventor: Olivier Savry, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 535 days.

(21) Appl. No.: 11/991,425

(22) PCT Filed: Sep. 22, 2006

(86) PCT No.: PCT/FR2006/002173
§ 371 (c)(1),
(2), (4) Date: Mar. 4, 2008

(87) PCT Pub. No.: WO2007/034087
PCT Pub. Date: Mar. 29, 2007

(65) Prior Publication Data
US 2010/0220025 A1    Sep. 2, 2010

(30) Foreign Application Priority Data

Sep. 22, 2005    (FR) ...................................... 05 09711

(51) Int. Cl.
*H01Q 7/08*    (2006.01)
(52) U.S. Cl. ........................................ 343/788; 343/867
(58) Field of Classification Search ................. 343/787, 343/788, 742, 867, 895
See application file for complete search history.

(56) References Cited

U.S. PATENT DOCUMENTS

| | | | | |
|---|---|---|---|---|
| 3,683,389 A | * | 8/1972 | Hollis | ........................... 343/788 |
| 4,857,893 A | * | 8/1989 | Carroll | ....................... 340/572.7 |
| 5,408,243 A | * | 4/1995 | D'Hont | ........................... 343/718 |
| 5,719,586 A | | 2/1998 | Tuttle | |
| 6,043,746 A | | 3/2000 | Sorrells | |
| 6,644,555 B1 | | 11/2003 | Berney | |
| 7,295,168 B2 | * | 11/2007 | Saegusa et al. | ............... 343/788 |
| 2002/0113747 A1 | * | 8/2002 | Tessier et al. | ................ 343/787 |
| 2004/0061660 A1 | | 4/2004 | Yoshida et al. | |
| 2008/0003457 A1 | | 1/2008 | Endo | |

FOREIGN PATENT DOCUMENTS

| | | |
|---|---|---|
| GB | 2 349 047 A | 10/2000 |
| JP | A-2001-297918 | 10/2001 |
| JP | A-2002-271127 | 9/2002 |
| JP | A-2003-218626 | 7/2003 |
| JP | A-2004-088139 | 3/2004 |
| JP | A-2005-184094 | 7/2005 |
| JP | A-2005-228908 | 8/2005 |
| WO | WO 2005/045992 A2 | 5/2005 |

OTHER PUBLICATIONS

Aug. 26, 2011 Office Action issued in Japanese Patent Application No. 2008-531739.

* cited by examiner

*Primary Examiner* — Michael C Wimer
(74) *Attorney, Agent, or Firm* — Oliff & Berridge, PLC

(57) ABSTRACT

The inventive antenna comprises a planar substrate carrying as first winding whose axis is arranged in a parallel position to the plane of the substrate. Said antenna also comprises at least one second winding, whose axis is arranged in a parallel position to the plane of the substrate and which is wound-up about a thin layer made of high magnetically permeable material and arranged in a parallel position with respect to the plane of the substrate. A third winding, whose axis is perpendicular to the first and second windings and which is wound-up about an additional thin layer can be provided. Said additional thin layer is arranged in a parallel position to the plane of the substrate and is made of high magnetically permeable material.

7 Claims, 3 Drawing Sheets

OMNIDIRECTIONAL FLAT ANTENNA AND METHOD OF PRODUCTION

BACKGROUND OF THE INVENTION

The invention relates to a flat antenna comprising a first flat coil formed on a surface of a flat substrate, the first coil having an axis perpendicular to the plane of the substrate, the antenna comprising a second coil having an axis parallel to the plane of the substrate.

The invention also relates to a method of production of one such antenna.

STATE OF THE ART

Flat antennas of this kind are commonly used for manufacturing Radio Frequency Identification (RFID) tags or transponders. These RFID tags comprise a chip connected to the flat antenna which is designed to pick up a magnetic wave coming from a remote reader. The energy necessary for operation of the RFID tag can be provided by the magnetic wave that is picked up or by an internal battery cell for active tags.

Current flat antennas are constituted by a coil formed by a flat winding of conducting tracks, for example in a spiral, on the substrate. This type of antenna in which the axis of the coil is perpendicular to the plane of the substrate is only sensitive to the magnetic wave component in the direction orthogonal to the plane of the substrate.

When the magnetic wave picked up by the antenna originates from a reader situated several meters away, the incidence of the magnetic wave on the antenna is often random. As the antenna is only sensitive to the magnetic wave component in the direction orthogonal to the plane of the substrate, the magnetic wave components comprised in the plane of the coil supported by the substrate are then not picked up.

Therefore, for a given emission power at the level of the reader, the quality of receipt of the antenna depends on its orientation, which makes operation of the RFID tag random. To guarantee a dependable reading distance independent of the orientation of the RFID tag, the latter has to have an antenna that is not flat, occupying a rather cubic volume, a coil being required in each direction of this volume, which is constraining in a large number of applications.

The document GB2349047 describes a magnetic tag reader comprising, for emission of a magnetic excitation field, an antenna having three distinct coils wound around the same flat substrate made of magnetic material. The three coils have axes perpendicular to one another.

Such an antenna does not enable low-power magnetic waves to be received satisfactorily.

OBJECT OF THE INVENTION

The object of the invention is to overcome these shortcomings by proposing a flat antenna sensitive to all the components of a magnetic wave of any incidence and enabling low-power magnetic waves to be received This object is achieved by an antenna according to the appended claims. In particular, the present invention thus provides a flat antenna comprising a first flat coil formed on a surface of a flat substrate, the first coil having an axis perpendicular to the plane of the substrate, the antenna comprising a second coil having an axis parallel to the plane of the substrate wherein the second coil is wound around a magnetic thin layer deposited on said surface of the substrate.

The loopback volume of each of the first and second coils is not "hampered" by the presence of the other coil, which enables shielding effects to be prevented.

According to another feature of the invention, the second coil is wound around a thin layer of a material with a high magnetic permeability, i.e. a relative permeability of more than 500.

The second coil is sensitive to at least one component of the magnetic wave parallel to the plane of the substrate. The presence of the high magnetic permeability material enables a small loopback cross-section of the second coil to be provided, by channelling and concentrating the field lines of the magnetic wave in the proximity thereof.

According to one development of the invention, the antenna comprises a third coil having an axis perpendicular to the axes of the first and second coils and wound around an additional thin layer of high magnetic permeability material parallel to the plane of the substrate. In this alternative embodiment, the material constituting each thin layer preferably comprises an axis of greatest magnetic susceptibility parallel to the axis of the corresponding coil. Each coil is then designed to pick up the component of the magnetic wave along the axis of said coil. The axes of the three coils being perpendicular to one another, the flat antenna breaks the incident magnetic wave down into three components in an orthogonal base connected to the substrate.

A method of producing an antenna according to the invention preferably comprises:
  deposition on the substrate of metallized tracks constituting the first coil,
  deposition of bottom metallized tracks of the second coil,
  deposition, parallel to the plane of the substrate, of the thin layer of high magnetic permeability material,
  formation, on said thin layer and at the periphery thereof, respectively of top metallized tracks of the second coil and of lateral metallized tracks connecting the top and bottom metallized tracks of the second coil.

BRIEF DESCRIPTION OF THE DRAWINGS

Other advantages and features will become more clearly apparent from the following description of a particular embodiment of the invention given for non-restrictive example purposes only and represented in the appended drawings, in which.

DESCRIPTION OF A PARTICULAR EMBODIMENT

Figure 1:
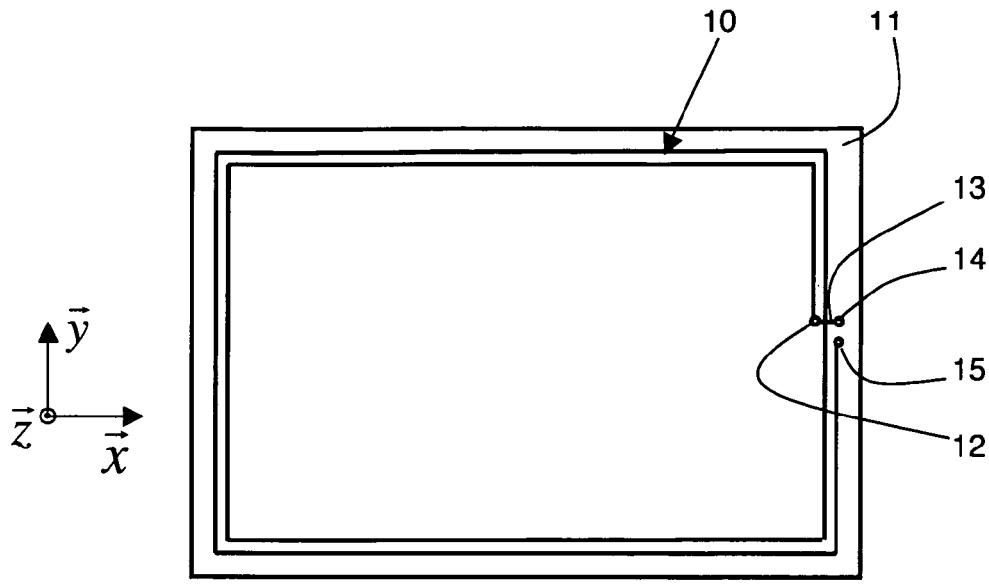
FIGS. 1 to 5 illustrate, in top view, various steps of an example of a method of production of a flat antenna according to the invention.

In the embodiment represented in FIG. 1, a first coil 10 is formed on a surface of a flat substrate 11 which can be made from any material, for example plastic, cardboard or paper. The first coil 10 is formed by a flat winding of spiral-wound conducting tracks, here with two substantially concentric turns, of rectangular shape. First coil 10 is made for example with silkscreened copper or by deposition of conducting ink. An orthogonal vector base ($\vec{x}, \vec{y}, \vec{z}$) is defined such that $\vec{x}$ and $\vec{y}$ are parallel to the axes of symmetry of first coil 10, and $\vec{z}$ is perpendicular to the plane of substrate 11. The axis of first coil 10, i.e. the axis around which it is wound, is parallel to $\vec{z}$. First coil 10 is therefore practically only sensitive to the component along $\vec{z}$ of an incident magnetic wave emitted by a remotely located reader (not represented).

In FIG. 1, first coil 10 is achieved by means of two superposed metallization levels separated by an insulating passivation layer (not represented). Two turns are formed at the bottom level between two ends. The outside end of the turns of first coil 10 constitutes a first connecting pad 15 of first coil 10. The other, inside, end 12 of the turns of first coil 10 is connected by a via (not represented) to a metallized segment 13 formed at the top metallization level. Segment 13 overlaps the turns of first coil 10 arranged at the bottom level without any electric contact. The distal end of segment 13 forms a second connecting pad 14 of first coil 10, arranged near to first connecting pad 15.

Figure 2:
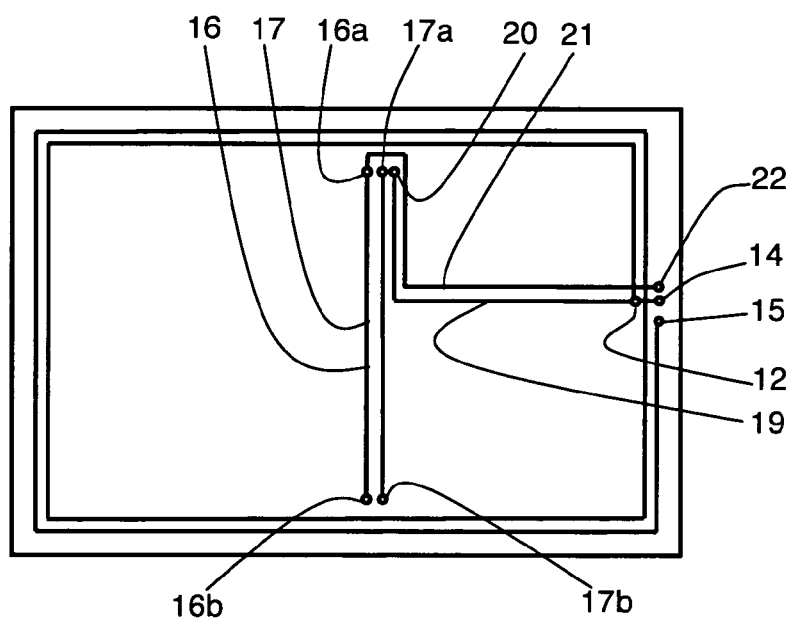

As represented in FIG. 2, bottom metallized tracks 16 and 17 of a second coil 18 (FIG. 3) are deposited at the top metallization level. Bottom metallized tracks 16 and 17 of second coil 18 are parallel, close to one another, and extend between the turns of first coil 10 along the axis of symmetry of first coil 10 parallel to $\vec{y}$. Connecting pads, referenced 16a, 16b, and respectively 17a, 17b, are arranged at the ends of bottom metallized tracks 16 and 17. At the top metallization level, a first metallized connecting track 19 connects inside end 12 of the turns of first coil 10 to a connecting pad 20 arranged close to connecting pad 17a. In FIG. 2, track 19 is substantially L-shaped. A second metallized connecting track 21 connects connecting pad 16a to a connecting pad 22 arranged close to connecting pad 14 of first coil 10.

Figure 3:
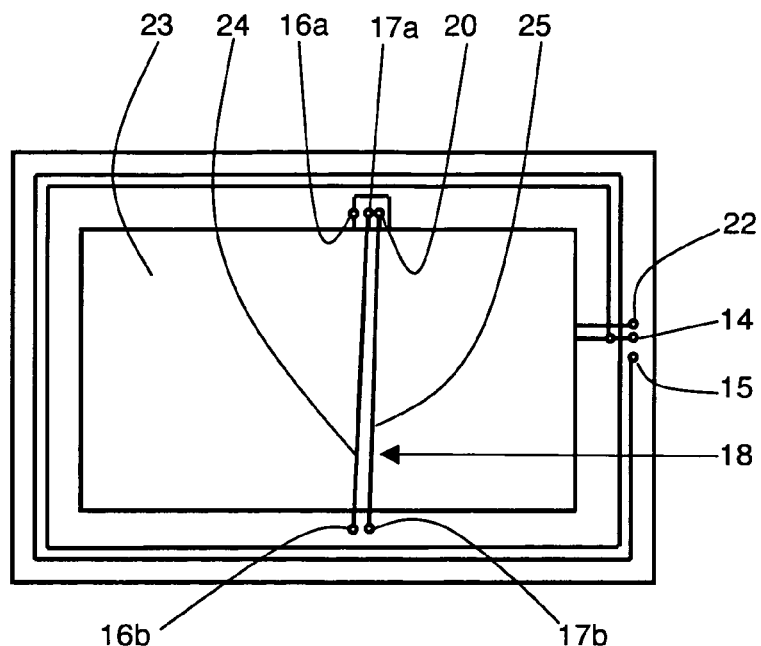

With reference to FIG. 3, a magnetic thin layer 23 is then deposited parallel to the plane of substrate 11 on the top metallization level. The relative permeability of the material is at least equal to 100 and preferably more than 500. Thin layer 23 extends in the central part of the turns of first coil 10 and between connecting pads 16a, 16b, 17a, 17b.

Again with reference to FIG. 3, top metallized tracks 24 and 25 of second coil 18 are formed parallel to tracks 16 and 17 on thin layer 23. Lateral metallized tracks (not represented) are formed at the periphery of thin layer 23 perpendicularly to the plane of substrate 11 to connect top metallized track 24 to connecting pads 17a and 16b. Other lateral metallized tracks (not represented) are also formed at the periphery of thin layer 23 to connect top metallized track 25 to connecting pads 17b and 20.

Bottom 16 and 17, top 24 and 25, and lateral metallized tracks together form two turns of a second coil 18 which is wound around thin layer 23. The axis of second coil 18, i.e. the axis around which it is wound, is parallel to $\vec{x}$. Second coil 18 is thus essentially sensitive to the component along $\vec{x}$ of an incident magnetic wave.

Figure 4:
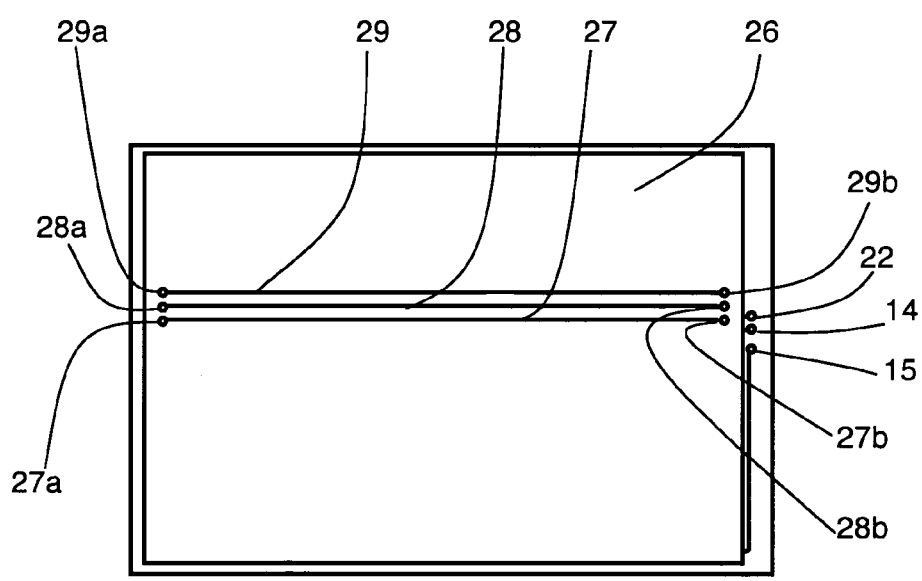

With reference to FIG. 4, an electrically insulating layer 26 is then deposited on substrate 11 so as to cover thin layer 23 and second coil 18. Only connecting pads 14 and 15 of first coil 10 and connecting pad 22 of second coil 18 are not covered.

Bottom metallized tracks 27, 28 and 29 of a third coil 30 (FIG. 5) are then deposited on insulating layer 26. Bottom metallized tracks 27, 28 and 29 of third coil 30 are parallel, close to one another, and extend along the axis of symmetry of first coil 10 parallel to $\vec{x}$. Connecting pads, respectively referenced 27a, 27b, 28a, 28b, and 29a, 29b, are arranged at the ends of bottom metallized tracks 27, 28 and 29.

Figure 5:
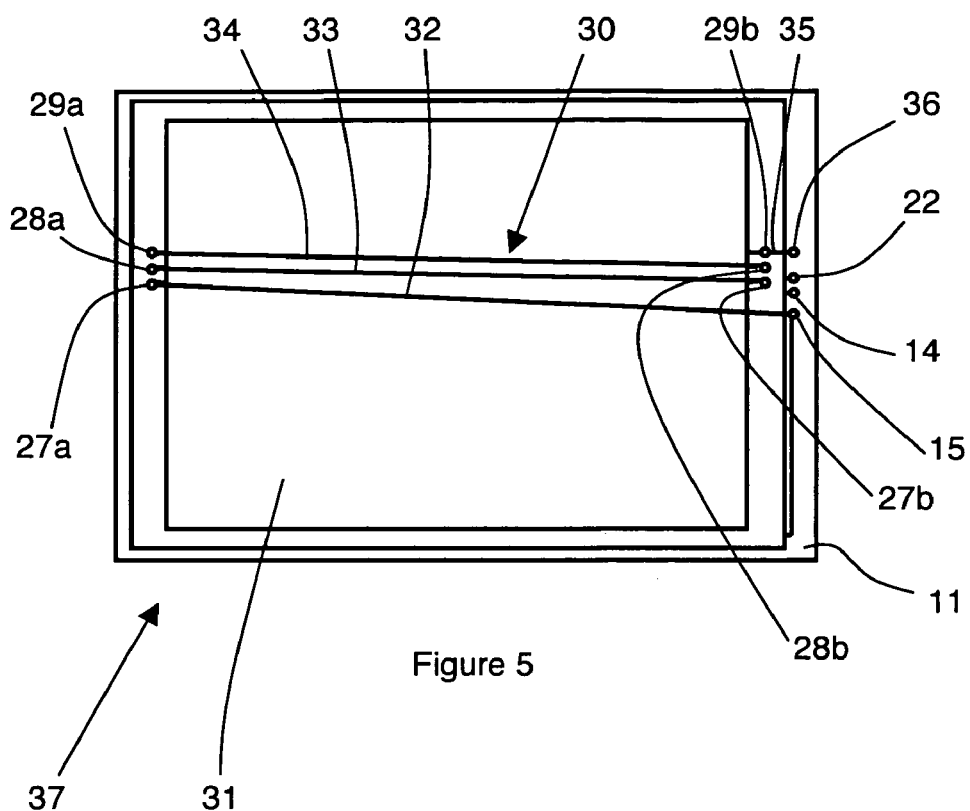

With reference to FIG. 5, an additional thin layer 31 of high magnetic permeability material is then deposited parallel to the plane of substrate 11 on insulating layer 26. The relative permeability of the material is preferably about 1000. Additional thin layer 31 extends between the connecting pads of bottom metallized tracks 27, 28 and 29.

Top metallized tracks 32, 33 and 34 of third coil 30 are then formed on additional thin layer 31. Lateral metallized tracks (not represented) are formed at the periphery of additional thin layer 31, perpendicularly to the plane of substrate 11 to connect the ends of metallized track 32 respectively to connecting pad 15 of first coil 10 and to connecting pad 27a. Other lateral metallized tracks (not represented) are also formed at the periphery of additional thin layer 31 to respectively connect the ends of metallized track 33 to connecting pads 27b and 28a and of metallized track 34 to connecting pads 28b and 29a. At the same time, a metallized segment 35 is deposited to extend bottom metallization 29 from connecting pad 29b. The distal end of metallization segment 35 forms a connecting pad 36 of third coil 30. In FIG. 5, tracks 33 and 34 are substantially parallel to tracks 27 to 29, whereas track 32 is slightly inclined to facilitate connection to pad 15.

Bottom 27, 28 and 29, top 32, 33 and 34, and lateral metallized tracks together form three turns of third coil 30 wound around additional thin layer 31. The axis of third coil 30, i.e. the axis around which it is wound, is parallel to $\vec{y}$. Third coil 30 is therefore essentially sensitive to the component along $\vec{y}$ of an incident magnetic wave.

The presence of thin layers 23 and 31 of high magnetic permeability material enables the small loopback cross-section of second coil 18 and third coil 30 to be compensated by channelling and concentrating the field lines of the magnetic wave in proximity thereto. To intensify and orient this phenomenon, the magnetic material of thin layer 23 is preferably deposited such as to have a greatest magnetic susceptibility oriented to be parallel to $\vec{x}$, and the magnetic material of additional thin layer 31 deposited with an axis of greatest magnetic susceptibility oriented to be parallel to $\vec{y}$. To do this, a suitably oriented magnetic field has to be applied when deposition is performed.

Flat antenna 37 according to the invention, able to be obtained by the method described above, therefore comprises a flat substrate 11 having a surface where there are formed a first flat coil 10 having an axis perpendicular to the plane of substrate 11, and a second coil 18 having an axis parallel to the plane of substrate 11 and wound around a thin layer 23 of high magnetic permeability material deposited on the surface of substrate 11 whereon first coil 10 is formed. Any other method enabling fabrication of a flat antenna 37 presenting these essential features of the invention can also be envisaged. Bottom metallized tracks 16 and 17 of second coil 18 can for example be formed at the same time as metallized segment 13 or in a subsequent step. In an alternative embodiment, second coil 18 can overlap first coil 10 to increase the loopback surface of second coil 18. An electrically insulating layer is then deposited on first coil 10 before deposition of bottom metallized tracks 16 and 17 of second coil 18.

Flat antenna 37 described above further comprises a third coil 30 having an axis perpendicular to the axes of first and second coils 10, 18, and wound around an additional thin layer 31 of a high magnetic permeability material parallel to the plane of substrate 11. Third coil 30 can be produced by the above production method or by any suitable production method.

Each coil 10, 18, 30 is designed to pick up the component of an incident magnetic wave along its axis. The axes of the three coils 10, 18, 30 being perpendicular to one another, flat antenna 37 comprising the three coils 10, 18, 30 breaks the incident magnetic wave down into three components in the orthogonal base ($\vec{x}, \vec{y}, \vec{z}$) associated with substrate 11. An omnidirectional flat antenna 37 is thus obtained. With the production method described above, the three coils 10, 18, 30 are connected in series and the signals are measured between connecting pads 22 and 36. In an alternative embodiment, the three coils 10, 18, 30 of flat antenna 37 can be connected in parallel.

The high magnetic permeability material is preferably sintered ferrite or Iron Hafnium Nitride (FeHfN). The former material presents the advantage of being able to be deposited on any type of substrate with a thickness varying from about ten microns to several millimeters. Its operating frequency is limited to about 300 MHz. The latter material can be deposited in a very thin layer (about 1 micron) with an alternation of nanometric FeHf layers and nitride passivations to ensure a low conductivity. Its operating frequency is limited to about 1 GHz and its relative permeability to about 900.

Furthermore, the metallized tracks of second and third coils 18, 30 can be of any suitable type, for example formed by tracks made of silkscreened copper or conducting ink. Coils 18 and 30 preferably extend along the axes of symmetry of first coil 10 so that the mutual impedances of the three coils 10, 18, 30 are zero.

In the case where flat antenna 37 according to the invention does not comprise third coil 30, it is preferable for second coil 18 to pick up the components of the incident magnetic wave along $\vec{x}$ and $\vec{y}$. The magnetic material of thin layer 23 around which second coil 18 is wound is then deposited without an axis of greatest magnetic susceptibility to be omnidirectional in the plane of substrate 11.

Furthermore, the order of superposition of coils 18 and 30 can vary according to the applications.

Flat antenna 37 according to the invention provides results of satisfactory quality unlike that described in the document GB2349047 in which a shielding effect between the three coils may occur. Indeed, for each coil 110, 111 and 122 of the antenna represented in figure 22 of this document, the loopback volume or surface delineated by the coil considered is "filled" by another coil limiting the penetration of incident magnetic waves by shielding effect. On the contrary, in the present invention, the influence of first coil 10 on operation (transmission and/or receipt) of second and third coils 18, 30 is nil as the respective loopback volumes delineated by the turns of these coils 18, 30 are situated above the plane of first coil 10.

To reduce the influence of second and third coil 18, 30 on operation of first coil 10, the number of turns of coils 18, 30 is very small and said turns are very close to one another so that the surface occupied by coils 18, 30 in a plane parallel to substrate 11 is much smaller than the surface delineated by first coil 10. For this, second and third coils 18 comprise a maximum of a few turns, preferably two for second coil 18 as illustrated in FIG. 3, and three for third coil 30 as illustrated in FIG. 5.

The invention claimed is:
1. A flat antenna comprising:
a flat substrate,
a first flat coil formed on a surface of the flat substrate, the first coil having an axis perpendicular to the plane of the substrate,
a first magnetic thin layer arranged on said surface of the substrate,
a second coil having an axis parallel to the plane of the substrate and wound around the first magnetic thin layer,
an electrically insulating layer arranged on the second coil and the first magnetic thin layer,
a second magnetic thin layer arranged on the electrically insulating layer, and
a third coil having an axis perpendicular to the axes of the first and second coils and wound around the second magnetic thin layer.

2. The antenna according to claim 1, wherein the first and second magnetic thin layers comprise a high magnetic permeability material, with a relative permeability of more than 500.

3. The antenna according to claim 1, wherein the second and third coils extend along the axes of symmetry of the first coil.

4. The antenna according to claim 2, wherein said high magnetic permeability material of the first magnetic thin layer comprises an axis of greatest magnetic susceptibility parallel to the axis of the second coil.

5. The antenna according to claim 2, wherein said high magnetic permeability material of the second magnetic thin layer comprises an axis of greatest magnetic susceptibility parallel to the axis of the third coil.

6. The antenna according to claim 1, wherein each of the second and third coils covers a smaller surface, in a plane parallel to the plane of the substrate, than the surface delineated by the first coil.

7. A method of production of an antenna according to claim 1, comprising:
deposition on the substrate of metallized tracks forming the first coil,
deposition of bottom metallized tracks of the second coil,
deposition, parallel to the plane of the substrate, of the thin layer of high magnetic permeability material,
formation, on the first magnetic thin layer and at the periphery thereof, respectively of top metallized tracks of the second coil and of lateral metallized tracks connecting the top and bottom metallized tracks of the second coil,
deposition of an electrically insulating layer covering the first magnetic thin layer and the second coil,
deposition on the electrically insulating layer of bottom metallized tracks of the third coil,
deposition, parallel to the plane of the substrate, of the second magnetic thin layer of high magnetic permeability material, and
formation, on the second magnetic thin layer and at the periphery thereof, respectively of top metallized tracks of the third coil and of lateral metallized tracks connecting the top and bottom metallized tracks of the third coil.

* * * * *